United States Patent Office 3,277,178
Patented Oct. 4, 1966

3,277,178
PREPARATION OF ALDEHYDES FROM ACID HALIDES
Herbert C. Brown, 1840 Garden St., West Lafayette, Ind.
No Drawing. Filed Feb. 27, 1962, Ser. No. 176,102
10 Claims. (Cl. 260—598)

This invention relates to the preparation of aldehydes and more particularly to the conversion of acid halides to the corresponding aldehydes by subjecting acid halide to the reducing action of alkali metal borohydrides. The method of the invention also produces useful by-products.

It is well known that carboxylic acid halides can be reduced catalytically to the aldehydes by using carefully poisoned palladium catalysts. This method is known as the Rosenmund Method and is illustrated by the equation:

$$RCOCl + H_2 \xrightarrow{Pd} RCHO + HCl \quad (1)$$

This method suffers from the disadvantage that the catalyst is very costly and must be carefully poisoned to permit reduction to the aldehyde stage without simultaneous reduction to the alcohol stage.

In recent years the complex hydrides, such as the alkali metal borohydrides and the alkali metal aluminum hydrides, have been introduced and widely used for organic reductions including the reduction of acid halides. It would be desirable to utilize these complex hydrides for the reduction of acid halides to aldehydes. Unfortunately, when an acid halide is subjected to the reducing action of an alkali metal borohydride or an alkali metal aluminum hydride in a solvent medium or other liquid carrier, the reduction proceeds predominately to the alcohol stage as illustrated by the following equations:

$$RCOCl + NaBH_4 \rightarrow RCH_2OBH_2 + NaCl \quad (2)$$

$$RCOCl + LiAlH_4 \rightarrow RCH_2OAlH_2 + LiCl \quad (3)$$

The boron complex and the aluminum complex produced as illustrated by Equations 2 and 3 respectively are converted to alcohols by treatment with water.

In the copending application of Richard F. McFarlin, Bookinkere C. Subba Rao and the present applicant, Serial No. 834,376, filed August 18, 1959, a method is described for overcoming this difficulty by using as the reducing agent a substitution product of an alkali metal aluminum hydride, for example, lithium tri-t-butoxy aluminum hydride. The reaction is illustrated by the equation:

$$RCOCl + LiAlH(O\text{-}t\text{-}Bu)_3 \rightarrow RCHO + LiCl + Al(O\text{-}t\text{-}Bu)_3 \quad (4)$$

The present invention is based upon the discovery that it is possible to utilize the more economical alkali metal borohydrides for reducing acid halides to aldehydes. In accordance with the invention an acid halide is subjected to the reducing action of a substantially equimolar amount of an alkali metal borohydride in a solvent or other liquid carrier in the presence of a substantially equimolar amount of a tertiary amine thereby reducing the acid halide to the corresponding aldehyde and forming an amine borane as a by-product as illustrated by the following equation where the tertiary amine is triethyl amine and the acid halide is benzoyl chloride:

$$C_6H_5COCl + NaBH_4 + (C_2H_5)_3N$$
$$\rightarrow C_6H_5CHO + NaCl + (C_2H_5)_3N{:}BH_3 \quad (5)$$

In general, the reaction takes place rapidly as illustrated by the typical reaction of benzoyl chloride and sodium borohydride in the presence of triethylamine. Thus, when a solution of sodium borohydride in dimethyl ether of diethylene glycol is added to a solution of benzoyl chloride and triethylamine in dimethyl ether of diethylene glycol at 0° C. the reaction is practically instantaneous, analysis by 2,4-dinitrophenylhydrazine revealing the formation of benzaldehyde in a yield of 74 percent.

One economical advantage of the method of the invention is that the amine borane formed as a by-product can be readily converted back to the alkali metal borohydride by reaction with an alkali metal hydride as illustrated by the equation:

$$NaH + (C_2H_5)N{:}BH_3 \rightarrow NaBH_4 + (C_2H_5)_3N \quad (6)$$

Any tertiary amine may be used in the practice of the invention which is capable of forming a stable amine borane derivative. As illustrative of such tertiary amines I may mention heterocyclic bases, such as pyridine, 2-, 3-, and 4-picolines; the higher alkyl pyridines, such as 4-n-butylpyridine, 4-n-octylpyridine, 2-nonylpyridine, 2,4-lutidine, 2,6-lutidine; quinoline, methyl quinoline, etc.; aromatic tertiary amines, such as N,N-dimethylaniline, N,N-di-n-butylaniline; simple derivatives of aromatic teritiary bases, such as N,N-dimethyl-m-toluidene, N,N-dimethyl-p-toluidene; aliphatic tertiary amines, such as trimethylamine, triethylamine, tri-n-butylamine; tertiary amines derived from morpholine, such as N-methylmorpholine, N-ethylmorpholine, N-propylmorpholine, N-butylmorpholine, N-octylmorpholine, N-decylmorpholine, N-octadecylmorpholine; tertiary diamines, such as N,N,N',N'-tetraethylethylene diamine and N,N,N',N'-tetramethylethylene diamine; tertiary amines derived from lower dialkylaminoethanol, such as dimethylaminoethanol and diethylaminoethanol.

Some tertiary amine boranes will effect reduction of an aldehyde under certain reaction conditions but the reducing action of such tertiary amine boranes is extremely slow. Consequently, tertiary amines which form such tertiary amine boranes may be used in the practice of the present invention since the alkali metal borohydrides reduce acid halides to aldehydes at a relatively rapid rate.

The method of the invention is applicable for the conversion to aldehyde of any acid halide heretofore reducible by the action of an alkali metal borohydride. As illustrative of such acid halides I may mention acetyl chloride, propionyl chloride, isobutyryl chloride, n-butyryl chloride, trimethylacetyl chloride, isocaproyl chloride, lauroyl chloride, palmityl chloride, stearyl chloride, cyclopropylcarbonyl chloride, cyclohexane carbonyl chloride, crotonyl chloride, oleyl chloride, sorbyl chloride, benzoyl chloride, p-t-butylbenzoyl chloride, naphthoyl chloride, trichloroacetyl chloride, monoethylsuccinate acid chloride, terphthalyl chloride, symmetrical ortho-phthalyl chloride, cinnamoyl chloride, nicotinyl chloride, o-chlorobenzoyl chloride, m-nitrobenzoyl chloride. The other acid halides, such as the bromides, iodides, etc., corresponding to the above acid chlorides may be used but are not readily available on a commercial scale.

Any solvent or liquid carrier used heretofore in the reduction of an acid halide with an alkali metal borohydride may be used in the practice of the invention. It is preferred, however, to conduct the reaction in an ether in which the acid halide and the alkali metal borohydride as well as the tertiary amine are at least partially soluble, such as diethyl ether, tetrahydrofuran, dimethyl ether of diethyleneglycol, etc. The reaction may be conducted at any temperature heretofore used in the reduction of an acid halide with an alkali metal borohydride.

Any alkali metal borohydride, such as sodium borohydride, potassium borohydride or lithium borohydride may be used in the practice of the invention, although sodium borohydride generally is preferred because of its lower cost. In some cases lithium borohydride is advantageous because of its greater solubility in ether solvents, such as diethyl ether and tetrahydrofuran.

The aldehyde produced can be separated from the amine borane by treating the reaction mixture with excess sodium bisulfite thereby precipitating the aldehyde complex from which the aldehyde can be recovered in known manner. In cases where the aldehyde is a solid, it is preferable to use a tertiary amine in the reaction which forms a liquid amine borane, such as triethylamine borane, to facilitate recovery of the aldehyde. If the aldehyde to be formed is a liquid, it is preferable to utilize an amine which forms a solid amine borane. It has been discovered that the lower N,N,N',N'-tetraalkylethylene diamines, such as N,N,N',N'-tetramethylethylene diamine and N,N,N',N'-tetraethylethylene diamine, possess unique characteristics for this purpose. By using N,N,N',N'-tetramethylethylene diamine in the acid halide reduction, the corresponding amine borane precipitates and is readily separated by filtration from a solution of the aldehyde.

N,N,N',N'-tetramethylethylene diamine borane has the formula

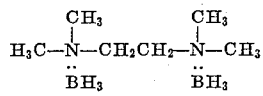

This amine borane is a white solid having a melting point of 179° C. and is stable in air and unaffected by water. Its solubility in all common solvents is exceedingly low. The following are its solubilities at 25° C.:

| | |
|---|---|
| Water | Insoluble |
| Methanol | 0.01 M |
| Tetrahydrofuran | 0.08 M |
| Dimethylether of diethylene glycol | 0.06 M |
| Cyclohexane | 0.002 M |
| Benzene | 0.06 M |

This amine borane is not attacked by 1 M hydrochloric acid at 25° C., although pyridine borane, trimethylamine borane and triethylamine borane react rapidly with evolution of hydrogen. Even 12 M hydrochloric acid attacks the product only slowly, liberating only two of the three hydrogen atoms of each $BH_3$ group in 2 to 3 hours.

N-methylmorpholine borane, which can be produced as a by-product in the method of the invention, is a white crystalline solid having a melting point of 43.5–44.5° C. It possesses a unique water solubility for amine boranes, giving a solution which is 1.07 M in the amine borane. Typical solubilities at 25° C. are:

| | |
|---|---|
| Water | 1.07 M |
| Methanol | 2.8 M |
| Tetrahydrofuran | 4.0 M |
| Dimethylether of diethylene glycol | 1.3 M |
| Cyclohexene | 0.18 M |
| Benzene | 1.45 M |

Its unusually high solubility in water makes it possible to separate the amine borane formed in the practice of the invention from a water insoluble aldehyde by washing the product with water. The other lower N-alkylmorpholine boranes and N-phenylmorpholine borane possess similar properties.

The high solubility of the lower N-alkylmorpholine boranes, especially the N-methylmorpholine borane, in water, methanol, dimethylether of diethylene glycol, and such non-polar solvents as tetrahydrofuran and benzene is unexpected and renders them highly useful as reducing agents in such solvents. Thus, chemical compounds containing a reducible functional group including an atom other than hydrogen and carbon can be reduced by associating the compound with a lower N-alkyl morpholine borane or N-phenyl-morpholine borane in these solvents at a temperature sufficient to cause a chemical reaction but sufficiently low that the borane does not thermally decompose during the reaction. Although the solubility of the lower alkyl N,N,N',N'-tetraalkyethylene diamine boranes in common solvents is less, they are also useful as reducing agents.

It has also been discovered that the lower N-alkylmorpholine boranes and N-phenylmorpholine borane possess another unexpected property, namely, that they are unusually good hydroborating agents. Treatment of olefins, such as 1-hexene, 1-actene, and 1-octadecene with trimethylamine borane in refluxing benzene solution for 10 hours results in no more than 15 percent conversion of the olefin to the organoboron compound. In contrast, the borane addition compounds of N-methylmorpholine, N-ethylmorpholine, N-butylmorpholine, N-phenylmorpholine produced more than 90 percent conversion in less than 1 hour under these conditions.

As illustrative of the previously mentioned tertiary amines derived from lower dialkylaminoethanol, I may mention the corresponding borates. These borates may be prepared by treating the lower dialkylaminoethanol with boric acid as illustrated by the equation:

$$3(CH_3)_2NCH_2CH_2OH + (HO)_3B$$
$$\rightarrow [(CH_3)_2NCH_2CH_2O]_3B + 3H_2O \quad (7)$$

These borate esters form amine boranes having the formula

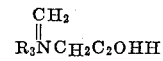

where R is a lower alkyl radical. These amine boranes are waxy solids, highly soluble in water. These amine boranes may be prepared as a by-product in the conversion of an acid halide to aldehyde in accordance with the invention. They also may be prepared by treating the dialkylaminoethanol with an alkali metal borohydride and one equivalent of acid to form a boron complex of the amine borane which is treated with water to convert it to the amine borane as illustrated by the equations:

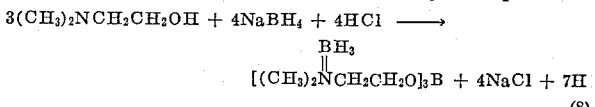

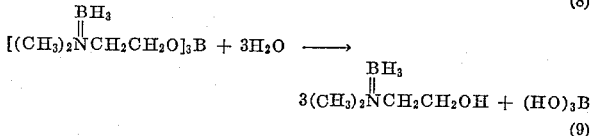

The high water solubility of these amine boranes renders them very useful for applications requiring highly soluble amine boranes. They are particularly useful as reducing agents and hydroborating agents.

The invention is illustrated further by the following specific examples.

*Example I*

Benzoyl chloride, 50 mmoles, was dissolved in 25 ml. of dimethyl ether of diethylene glycol. In an addition funnel was placed 50 mmoles of sodium borohydride in dimethyl ether of diethylene glycol containing 50 mmoles of triethylamine. The solution of sodium borohydride and amine was added over a period of 0.5 to 1 hour to the solution of the acid halide, the reaction mixture being maintained at 0° C. Analysis by gas chromatography showed the reaction to be complete immediately following the addition of the solution of sodium borohydride and amine.

Since the amine borane and the aldehyde formed are both water insoluble liquids, the isolation of the aldehyde was carried out using 50 ml. of a saturated sodium bisulfite solution. The precipitated bisulfitealdehyde addition compound was collected, washed with ether, and then decomposed in the usual manner. A 65% yield of benzaldehyde was obtained.

The same procedure was utilized for the synthesis of n-butyraldehyde, n-stearyl aldehyde, o-chlorobenzaldehyde, and cyclohexane carboxaldehyde.

Example II

The procedure of Example I was duplicated utilizing lithium borohydride in diethyl ether solution. A 68% yield of benzaldehyde was recovered.

Example III

The procedure of Example I was repeated utilizing p-nitrobenzoyl chloride as the acid halide. The reaction product was drowned in ice-water and the solid p-nitrobenzaldehyde was recovered by filtration, washed with small amounts of aqueous alcohol and recrystallized from dilute alcohol. The yield was 65%.

Example IV

The procedure of Example II was repeated utilizing p-nitrobenzoyl chloride and pyridine with lithium borohydride in diethyl ether. The ether solution of the reaction product was washed with water to remove lithium chloride and chilled to precipitate p-nitrobenzaldehyde. The solid aldehyde was recovered by filtration. The yield was 58%.

Example V n-Butyryl chloride was reduced as in Example I, utilizing N,N,N',N'-tetramethylethylene diamine as the amine. The amine borane formed precipitated as a white, insoluble solid. It was separated by filtration, and the aldehyde was recovered by distillation. A yield of aldehyde of 58% was obtained.

The speed of the reduction is indicated by the fact that it proceeds readily even at minus 78° C. At this temperature a 77% yield of aldehyde was obtained.

Example VI

The synthesis described in Example V was repeated, but the amine was mixed with the acid chloride in the reaction flask and the borohydride solution was added to the solution of amine and acid chloride.

Example VII

The following procedure indicates the advantages of utilizing the water solubility of N-methylmorpholine borane to achieve separation from a water insoluble aldehyde.

The procedure of Example I was used utilizing p-t-butylbenzoyl chloride as the acid halide and N-methylmorpholine as the tertiary amine. The reaction mixture was drowned in a large excess of water and the aldehyde taken up in ether. The ether extract was washed with several portions of water to remove the water soluble N-methylmorpholine borane. An excellent yield of p-t-butylbenzaldehyde was obtained.

Example VIII

N,N-dimethylaminoethanol was treated with boric acid to form the corresponding borate. o-Chlorobenzoyl chloride in diethyl ether was treated with a solution of lithium borohydride and the borate ester of N,N-dimethylaminoethanol in diethyl ether. The ether solution of the reaction product was washed with several small portions of water to remove the water soluble amine borane. The ether solution was dried and distilled. A 79% yield of o-chlorobenzaldehyde was obtained.

I claim:

1. In a method for reducing a carboxylic acid halide which comprises subjecting the acid halide to the reducing action of an alkali metal borohydride in an ether reaction medium in which the acid halide and the alkali metal borohydride are at least partially soluble, the improvement wherein the reduction is conducted in the presence of a tertiary amine which is at least partially soluble in the reaction medium and which is capable of forming a stable amine borane thereby forming a reaction mixture comprising an aldehyde corresponding to said acid halide and a borane corresponding to said tertiary amine, and separating said aldehyde from the reaction mixture, said acid halide, borohydride and tertiary amine being used in substantially equimolar proportions, the temperature used being between about minus 78° C. and 0° C.

2. The method as claimed by claim 1 wherein the acid halide is an acid chloride.

3. The method as claimed by claim 2 wherein the alkali metal borohydride is selected from the group consisting of sodium borohydride and lithium borohydride.

4. The method as claimed by claim 3 wherein the tertiary amine is a heterocyclic base.

5. The method as claimed by claim 3 wherein the tertiary amine is an aromatic amine.

6. The method as claimed by claim 3 wherein the tertiary amine is a lower alkyl amine.

7. The method as claimed by claim 3 wherein the tertiary amine is a lower N-alkylmorpholine.

8. The method as claimed by claim 3 wherein the tertiary amine is a lower N,N',N'-tetraalkylethylene diamine.

9. The method as claimed by claim 3 wherein the tertiary amine is a lower N-alkyl morpholine.

10. The method as claimed by claim 3 wherein the tertiary amine is a borate ester of a lower dialkylaminoethanol.

References Cited by the Examiner

UNITED STATES PATENTS

| | | | |
|---|---|---|---|
| 2,645,636 | 7/1953 | Sogn | 260—689 |
| 2,678,949 | 5/1954 | Banus et al. | 260—583 |
| 2,806,883 | 9/1957 | Mikeska et al. | 260—599 |
| 2,807,614 | 9/1957 | Lane | 260—247 |
| 2,810,760 | 10/1957 | Gabbett | 260—601 |
| 2,811,557 | 10/1957 | Graham et al. | 260—584 |
| 2,875,248 | 2/1959 | Wright et al. | 260—584 |
| 2,916,518 | 12/1959 | Burg et al. | 206—606.5 |
| 2,971,031 | 2/1961 | Ryschkewitsch | 260—606.5 |
| 2,993,895 | 7/1961 | Winthrop | 260—247 |
| 2,997,485 | 8/1961 | Kuivila et al. | 260—689 |
| 3,051,754 | 8/1962 | Jenker | 260—583 |

LEON ZITVER, *Primary Examiner.*

NICHOLAS S. RIZZO, *Examiner.*

R. PRICE, R. H. LILES, *Assistant Examiners.*